US009532178B2

(12) United States Patent
Kim et al.

(10) Patent No.: US 9,532,178 B2
(45) Date of Patent: Dec. 27, 2016

(54) LOCATION MANAGEMENT SYSTEM

(71) Applicants: Dong-Yeon Kim, Yongin-si (KR); Jeong-Yong Pyo, Gwangmyeong-si (KR)

(72) Inventors: Dong-Yeon Kim, Yongin-si (KR); Jeong-Yong Pyo, Gwangmyeong-si (KR)

( * ) Notice: Subject to any disclaimer, the term of this patent is extended or adjusted under 35 U.S.C. 154(b) by 0 days.

(21) Appl. No.: 14/391,457

(22) PCT Filed: Mar. 25, 2013

(86) PCT No.: PCT/KR2013/002449
§ 371 (c)(1),
(2) Date: Oct. 9, 2014

(87) PCT Pub. No.: WO2013/154281
PCT Pub. Date: Oct. 17, 2013

(65) Prior Publication Data
US 2015/0080018 A1 Mar. 19, 2015

(30) Foreign Application Priority Data

Apr. 13, 2012 (KR) .................. 10-2012-0038700
Jul. 5, 2012 (KR) .................. 10-2012-0073522

(51) Int. Cl.
H04W 24/00 (2009.01)
H04W 4/02 (2009.01)
(Continued)

(52) U.S. Cl.
CPC ............ H04W 4/028 (2013.01); G01S 5/02 (2013.01); H04W 4/008 (2013.01); H04W 64/00 (2013.01);
(Continued)

(58) Field of Classification Search
None
See application file for complete search history.

(56) References Cited

U.S. PATENT DOCUMENTS 6,388,612 B1 * 5/2002 Neher .................. G01S 5/0018
224/164
2005/0068169 A1 * 3/2005 Copley .............. G08B 21/0283
340/539.13
(Continued)

FOREIGN PATENT DOCUMENTS

EP 2 053 573 A1 4/2009
KR 10-0864939 B1 10/2008
(Continued)

OTHER PUBLICATIONS

International Searching Authority International Search Report for PCT/KR2013/002449 dated Jun. 24, 2013.
(Continued)

Primary Examiner — Erika Washington
(74) Attorney, Agent, or Firm — Sughrue Mion, PLLC

(57) ABSTRACT

A location management system includes: user equipment that periodically repeats an operating state and a standby state with a predetermined time interval, transmits a short-range wireless communication signal including its own identification information; a user equipment managing server that collects and manages user management information including the identification information of the user equipment and manager information of a manager who manages the management target and that monitors and provides location information of the management target, the location of which needs to be monitored, to the manager; and a location information relay terminal that stores identification information of a signal previously transmitted from the user equipment and that provides the acquired location information and time information along with the identifica-
(Continued)

tion information to the user equipment managing server when both pieces of information agree to each other.

3 Claims, 4 Drawing Sheets

(51) Int. Cl.
*G01S 5/02* (2010.01)
*H04W 64/00* (2009.01)
*H04W 4/00* (2009.01)
*H04W 88/04* (2009.01)
*H04W 88/06* (2009.01)
*H04W 4/22* (2009.01)

(52) U.S. Cl.
CPC ............... *H04W 4/22* (2013.01); *H04W 88/04* (2013.01); *H04W 88/06* (2013.01)

(56) References Cited

U.S. PATENT DOCUMENTS

| 2009/0253402 | A1 | 10/2009 | Choo et al. |
| 2010/0295943 | A1* | 11/2010 | Cha ................ G01S 13/82 348/143 |
| 2011/0026452 | A1 | 2/2011 | Kang et al. |
| 2012/0032844 | A1* | 2/2012 | Mo ................ G01S 5/0027 342/357.46 |

FOREIGN PATENT DOCUMENTS

| KR | 10-0924146 B1 | 10/2009 |
| KR | 10-0967460 B1 | 7/2010 |
| KR | 10-1067392 B1 | 9/2011 |

OTHER PUBLICATIONS

European Patent Office, Communication dated Nov. 11, 2015, issued in corresponding European Application No. 13 77 6215.

* cited by examiner

LOCATION MANAGEMENT SYSTEM

CROSS REFERENCE TO RELATED APPLICATIONS

This application is a National Stage of International Application No. PCT/KR2013/002449, filed Mar. 25, 2013, claiming priority from Korean Patent Application Nos. KR 10-2012-0038700 filed on Apr. 13, 2012 and KR 10-2012-0073522 filed on Jul. 5, 2012, the contents of all of which are incorporated herein by reference in their entirety.

TECHNICAL FIELD

The present invention relates to a location management system that can easily acquire a location of a management target and rapidly provide information thereof to a manager (guardian or the like).

BACKGROUND ART

Since children, dotards, mentally-retarded persons, and the like have difficulty in recognizing or determining situations, they are vulnerable to crimes such as abduction, kidnap, and robbery and are vulnerable to mission and thus needs to be thoroughly managed.

Various attempts not to expose children, dotards, mentally-retarded persons, and the like to emergencies such as abduction, kidnap, robbery, and disappearance have been made under the leadership of the government or specific private organizations. However, it is actually difficult to completely protect children, dotards, mentally-retarded persons, and the like from emergencies such as abduction, kidnap, robbery, and mission.

In this regard, Korean Patent No. 10-0627655 (hereinafter, referred to as '655 patent) discloses a method of requesting for rescue when a user is subjected to emergencies such as abduction, kidnap, robbery, and mission. In the '655 patent, a wireless ID and data transmitter device carried by a rescue requester broadcasts data for rescue request, plural unspecified mobile communication terminals relays the data and location information received by the broadcasting and transmits the data and the location information to a central control station, and the central control station transmits analyzes the received data and location information to relevant organizations.

However, in the '655 patent, an emergency button disposed in the wireless ID and data transmitter device has to be pressed by a user so as to request for rescue. Accordingly, even when children, dotards, mentally-retarded persons, and the like having lower cognitive capability carry wireless ID and data transmitter devices, they may not recognize emergency and may not press the emergency button for requesting for rescue.

Since the terminals carried by the users are complicated and require high manufacturing costs, the users' economical burdens increase.

SUMMARY OF THE INVENTION

Technical Problem

The present invention is made in consideration of the above-mentioned circumstances and an object thereof is to provide a location management system that can easily confirm a location of a user by only causing the user to carry user equipment without doing any particular action.

Another object of the present invention is to provide user equipment having a simple configuration and high economic feasibility.

Still another object of the present invention is to provide a control module that controls other mobile communication terminals located around user equipment so as to relay location information of the user equipment.

Solution to Problem

According to an aspect of the present invention, there is provided a location management system for monitoring and managing a location of a user as a management target, including: user equipment that periodically repeats an operating state and a standby state with a predetermined time interval, transmits a short-range wireless communication signal including its own identification information in the operating state and that is carried by the management target; a user equipment managing server that collects and manages user management information including the identification information of the user equipment and manager information of a manager who manages the management target and that monitors and provides location information of the management target, the location of which needs to be monitored, to the manager; and a location information relay terminal that stores identification information of a signal previously transmitted from the user equipment that checks whether the identification information in the received signal agrees to the stored identification information when the short-range wireless communication signal transmitted from the user equipment is received, and that provides the acquired location information and time information along with the identification information to the user equipment managing server when both pieces of information agree to each other.

According to another aspect of the present invention, there is provided a terminal device that is used for a user as a management target to notify its own location, including: a communication module that loads its own identification information onto a signal based on a predetermined short-range wireless communication protocol and that transmits the signal; a control unit that controls the communication module so as to periodically perform an operation of transmitting a short-range wireless communication signal onto which the identification information is loaded with a predetermined time interval; and a storage unit that stores information including the identification information transmitted from the communication module.

According to still another aspect of the present invention, there is provided a terminal device that is used for a user as a management target to notify its own location, including: a mobile communication terminal that operates as an access point (AP) of a short-range wireless communication protocol; and a control module that is mounted on the mobile communication terminal and that controls the mobile communication terminal so as to periodically operate as the access point (AP) of the short-range wireless communication protocol with a predetermined time interval.

According to still another aspect of the present invention, there is provided a control module of a location information relay terminal for relaying location information of a terminal device carried by a management target, including: an information managing unit that stores and manages identification information of the terminal device carried by the management target; an information checking unit that determines whether identification information received from external terminal devices by short-range communications agrees to the identification information stored in the information managing unit; and an information providing unit that acquires and provides the location information along with the identification information when a signal indicating that both pieces of identification information agree to each other.

Effects of the Invention

The location management system and method according to the present invention exhibit the following effects.

First, it is possible to enable guardians to easily check locations of users such as children, dotards, and mentally-retarded persons having low cognitive capability by carrying user equipment capable of performing short-range communications without requesting the users for doing any particular action.

Second, it is possible to reduce the risk of disappearance of users having low cognitive capability such as children, dotards, and mentally-retarded persons by enabling guardians to easily check locations of the users having low cognitive capability.

Third, since a location of a user can be checked using only identification information that is broadcast by terminals, it is possible to implement a device for providing the location of a user with a small size.

Fourth, it is possible to rapidly and accurately relay a location of a user using widely-spread mobile communication terminals as mediums.

Fifth, since locations of animals or objects (valuables or vehicles) not capable of transmitting a request for rescue can be automatically checked by attaching small-size communication terminals to the animals or objects (valuables or vehicles), it is possible to reduce the risk of loss of the animals or objects (valuables or vehicles).

BEST MODE FOR CARRYING OUT THE INVENTION

Hereinafter, exemplary embodiments of the present invention will be described in detail with reference of the accompanying drawings. Specific details are described below, which are provided to help easily understand the present invention as a whole. It will be apparent to those skilled in the art that these specific details can be modified or improved without departing from the scope of the invention.

Figure 1:
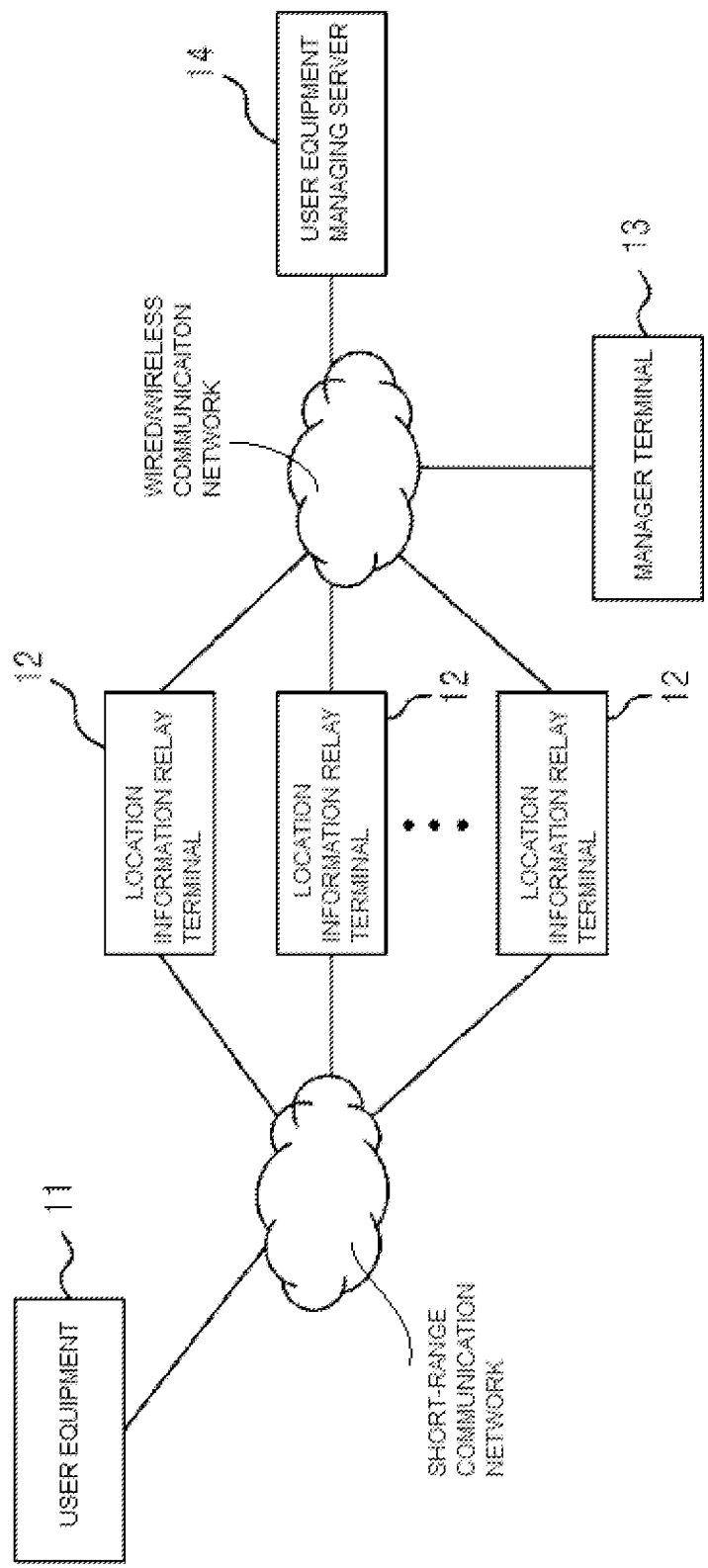
FIG. 1 is a diagram illustrating a whole configuration of a location management system according to the present invention.

FIG. 1 is a conceptual diagram schematically illustrating a configuration of a location management system according to an embodiment of the present invention.

Referring to FIG. 1, the location management system according to the present invention includes user equipment 11 that operates for every predetermined time unit to output its own identification, plural location information relay terminals 12 that transmit location information at the time point at which the identification information, from the user equipment 11 is received and the received identification information of the user equipment, a user equipment managing server 14 that stores and manages information of the user equipment 11, that checks whether the user equipment 11, the location of which is monitored on the basis of the location information provided from the location information relay terminals 12, is a management target, and that performs a followup process corresponding thereto, and a manager terminal 13 that registers the information of the user equipment 11 as the management target in the user equipment managing server 14 and that is provided with the location information of the user equipment as the management target from the user equipment managing server 14.

In an embodiment of the present invention, the plural location information relay terminals 12 mean plural unspecified mobile communication terminals located in a short range in which a signal output from the user equipment 11 by short-range wireless communication can be received. Since the current location of the user equipment 11 and the current locations of the position information relay terminals 12 are equal to each other within an error range, the location information of the relay terminals 12 is used to confirm of the location information of the user equipment 11.

The user equipment 11 is a terminal carried by a user as a management target such as a child, a dotard, or a mentally-retarded person having the risk of disappearance and operates for every predetermined time interval so as to transmit a predetermined short-range wireless communication signal including its own identification information. Specifically, the user equipment 11 includes a short-range communication module. The communication module is used to transmit a user's identification information and does not operate always but is controlled so as to repeat an operating state and a standby state for every predetermined time interval. The reason for causing the communication module of the user equipment 11 to intermittently operate is that the power consumption of a mobile power source of the user equipment 11 can be reduced to use the user equipment 11 for a longer time and a synchronization operation of causing the location information relay terminals 12 to receive the identification information transmitted from the user equipment 11 at a predetermined timing can be performed.

The communication module may be a module that performs short-range wireless communication and that supports at least one of protocols of Wi-Fi, NFC, Bluetooth, Zigbee, UWB, and the like and may be preferably a module that supports the Wi-Fi protocol. The identification information transmitted from the user equipment includes at least a short-range communication SSID and a MAC address.

On the other hand, each location information relay terminal 12 is a mobile communication terminal that is normally used and includes a first communication module that can normally perform short-range communication and a second communication module that performs communication with a mobile communication network. The location information relay terminal 12 includes a control module according to the present invention that receives a signal output from the user equipment 11 via the first communication module and performs a function of checking location information at the time point at which the identification information included in the signal from the user equipment is confirmed and providing the confirmed location information to the user equipment managing server 14 via the mobile communication network or the wireless Internet network.

That is, when the first communication module receives the short-range wireless communication signal transmitted from the user equipment 11, the control module confirms the identification information included in the received signal, acquires current location information from an internal location information checking module when it is confirmed that the received signal is the SSID transmitted from the user equipment as the management target, and transmits the MAC address of the user equipment along with the SSID and the location information to the user equipment managing server is the mobile communication network or the wireless Internet network.

The location information checking module in each location information relay terminal 12 may include at least one of a GPS module, a BeiDou navigation module, a GLOBASS module, a COMPASS module, a COMPASS module, a Galileo module, an IRNSS module, and a SPATIRE module.

The manager terminal 13 may be a normal mobile communication terminal that is carried and managed by a manager (for example, a guardian) managing the user and is connected to the user equipment managing server 14 via a wired/wireless communication network. The manager terminal 13 is connected to the user equipment managing server 14 to input information for management of the user equipment 11 and to receive the location information of the user equipment transmitted from the user equipment managing server 14 so as to check the location of the user.

The manager terminal 13 may be configured to communicate with the user equipment 11 in a one-to-one communication manner. This is because this function may be required for searching for the signal of the user equipment 11 or changing the internal functions of the user equipment 11 in the communicably-connected state when the manager reaches a location corresponding to the location information provided from the user equipment managing server 14.

The user equipment managing server 14 is a server that manages information of user equipment of a management target and location information f the user equipment, provides environments (for example, a web server and an application) capable of receiving and managing a request for management of specific user equipment from the manager terminal 13, and stores and manages management information of the user equipment as the management target requested by the manager terminal 13. The user equipment managing server performs a function of frequently receiving identification information and location information of the user equipment transmitted from the location information relay terminals 12, comparing the received information with user information stored in a database thereof to confirm whether the user equipment is user equipment as the management target, and notifying the received information to the manager terminal 13 when information on the user equipment set as the management target is received.

The user management information may include the identification information of the user equipment 11, the information of the user carrying the user equipment 11, user equipment management grading information, and manager (guardian) information. The user equipment management grading information may be set to general, disappearance, loss, and emergency which indicate states of the user requested by the manager (guardian). The manager information may include the name, the phone number, the E-mail address, the address, the relationship, and the corresponding manager terminal identifier of the manager.

The overall operation of the location management system according to the present invention will be described below in brief. In the below description of the location management system, it is basically assumed that the user equipment managing server 14 receives the user management information from the manager terminal 13, stores and manages the received user management information, and performs a function of checking and providing location information of the user equipment 11 transmitted from the location information relay terminals 12.

First, in the user equipment 11 carried by a user such as a child, a dotard, and a mentally-retarded person having the risk of disappearance who is set as a management target by the manager, the communication module thereof periodically operates for every predetermined time interval. Accordingly, the user equipment 11 broadcasts a short-range wireless communication signal including its own identification information on the basis of a predetermined short-range communication protocol for every predetermined time interval, and the plural unspecified location information relay terminals 12 located within a signal coverage of the user equipment 11 receive the identification information (such as an SSID and a MAC address) of the user equipment via the first communication modules thereof.

Each location information relay terminal 12 having received the identification information of the user equipment 11 checks whether the received identification information agrees to the use terminal identification information (SSID) stored in advance therein, and acquires the time information and the location information when both pieces of identification information agree to each other. Thereafter, the location information relay terminal transmits the user equipment identification information, the time information of the location information relay terminal 12, and the location information to the user equipment managing server 14 via the mobile communication network or the wireless Internet network through the use of the second communication module.

When the user equipment-relevant information is received from the location information relay terminal 12, the user equipment managing server 14 searches the internal database thereof, confirms the manager terminal 13 corresponding to the received user equipment-relevant information, and transmits the user equipment-relevant information received from the location information relay terminal 12 and the time information to the manager terminal 13 corresponding to the user equipment 11.

Through these operations, the location of the user set as the management target can be easily confirmed by the manager (guardian).

The operations of the location management system according to the present invention have been roughly described above, and the detailed configurations and operations of the user equipment 11 and the location information relay terminal 12 will be described below in detail.

Figure 2:
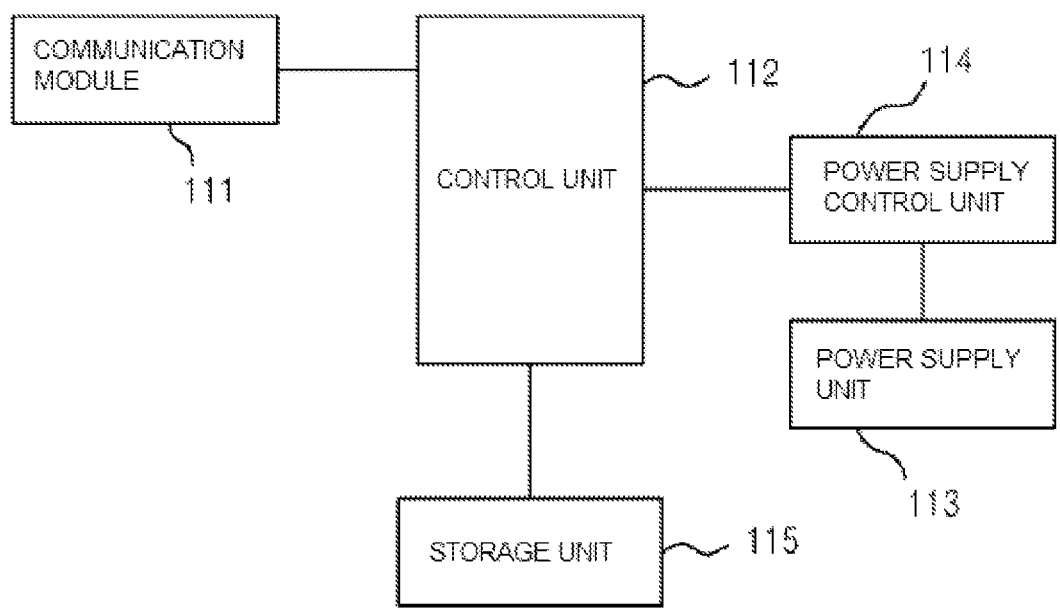
FIG. 2 is a diagram illustrating a configuration of user equipment according to an embodiment of the present invention.

FIG. 2 is a block diagram illustrating the configuration of the user equipment 11 according to an embodiment of the present invention. Referring to FIG. 2, the user equipment 11 according to the embodiment of the present invention basically includes a communication module 111, a control unit 112, a power supply unit 113, a power supply control unit 114, and a storage unit 115.

The communication module 111 may be a module that performs short-range wireless communication and that supports at least one of the protocols of Wi-Fi, NFC, Bluetooth, Zigbee, UWB, and the like and may be preferably a module that supports the Wi-Fi protocol.

The communication module 111 broadcasts its own identification information (such as the Internet IP, the SSID, and the MAC address) using short-range wireless communication so as to enable the neighboring location information relay terminals 12 to receive the identification information.

The control unit 112 is a device for controlling the overall operations of the user equipment 11 and controls the operations of the functional units therein.

The power supply unit 113 is a device for supplying power required for operation of the user equipment 11 and includes a secondary battery capable of being recharged such as a nickel-cadmium battery (NiCd), a nickel-hydrogen storage battery (NiMH), a lithium ion battery, and a lithium ion polymer battery. The power supply unit 113 may have a charging terminal used to recharge the secondary battery using power supplied from the outside and may further include a solar cell battery capable of converting solar energy into electric energy and providing the electric energy.

As described above, it is preferable that the user equipment 11 do not normally operate but periodically operate with a predetermined period. For this purpose, in order to minimize the power consumption of a portable power supply unit 113 of the user equipment 11, the power supply control unit 114 controls the power supplied to the functional units of the user equipment 11 so as for the communication module 111 and the control unit 114 to operate for a predetermined period of time with the predetermined period and to maintain the standby state for the other period of time. The storage unit 116 is a memory for storing user identification information, function setting information, and the like.

The detailed operations of the user eguipment 11 having the above-mentioned elements will be described below.

When the functional units of the user equipment 11 including the communication module 111 and the control unit 112 maintain the standby state and reaches a predetermined time by the counting of the time of the power supply control unit 114, the control unit 112 and the communication module 111 are supplied with power to switch the standby state to the operating state.

In response thereto, the communication module 11 broadcasts the identification information, and the control unit 112, the communication module 111, and the like are switched to the standby state under the control of the power supply control unit 114 when a predetermined time elapses.

Figure 3:
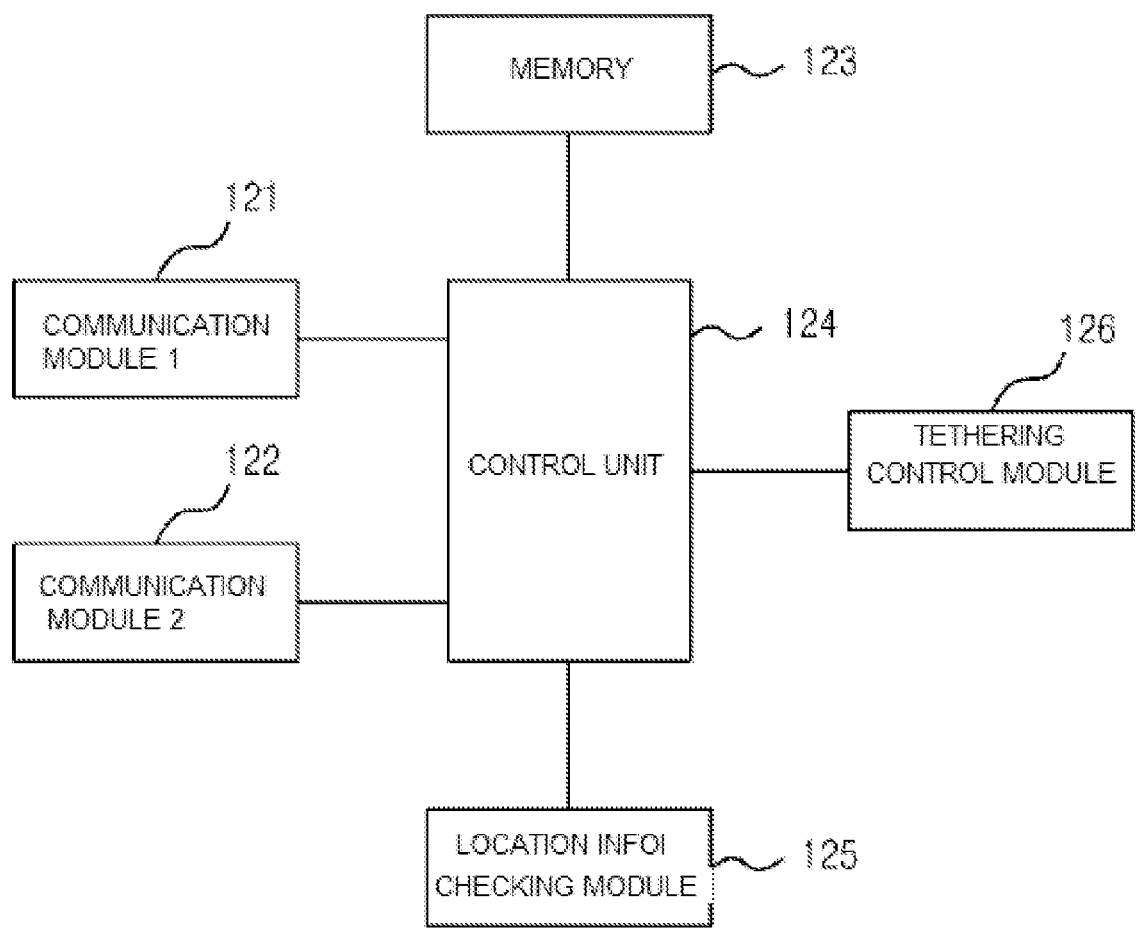
FIG. 3 is a diagram illustrating a configuration of user equipment according to another embodiment of the present invention.

FIG. 3 is a block diagram illustrating a partial configuration of the user equipment according to another embodiment of the present invention. The user equipment illustrated in FIG. 3 is embodied using a normal mobile communication terminal such as a smart phone supporting a tethering function, in which application software for performing the function of the user equipment illustrated in FIG. 2 is mounted on the mobile communication terminal such as a smart phone.

The tethering function is a function of controlling a mobile communication terminal so as to serve as an access point (AP) of Wi-Fi communication and is a function basically built into a recent smart phone.

FIG. 3 illustrates important functional units of a normal mobile communication terminal, which basically includes a first communication module 121 that performs a short-range wireless communication protocol of Wi-Fi, NFC, Bluetooth, Zigbee, UWB, or the like, a second communication module 122 that performs a normal mobile communication protocol such as CDMA, WCDMA, GSM, and LTE, and a control unit 129 that collectively controls the operations of the functional units thereof.

Accordingly, the user equipment according to the another embodiment of the present invention further includes a tethering control module 126 that enables a mobile communication terminal such as a smart phone to perform the function of the user equipment according to the present invention, and the tethering control module 126 is embodied by application software.

The tethering control module 126 controls the tethering function of the mobile communication terminal to operate with a predetermined period of time. That is, the tethering control module controls the mobile communication terminal to enable the tethering function for every predetermined time interval, and the control unit 124 broadcasts the identification information including an SSID and a MAC address via the first communication module performing short-range communication so as to perform the operations the user equipment described in the embodiment illustrated in FIG. 2.

Figure 4:
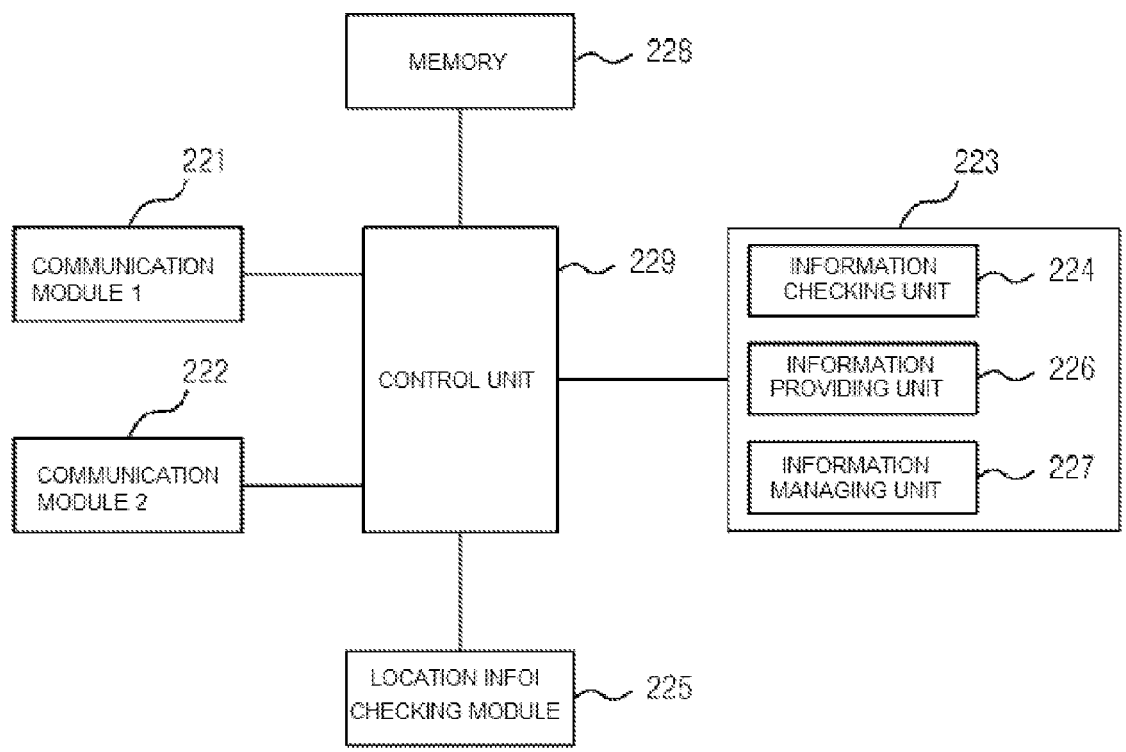
FIG. 4 is a block diagram illustrating a configuration of a location information relay terminal including a control module according to an embodiment of the present invention.

FIG. 4 is a block diagram illustrating the configuration of a location information relay terminal 12 including a control module according to an embodiment of the present invention.

Referring to FIG. 4, the location information relay terminal is a normal mobile communication terminal and basically includes a first communication module 221 that performs a short-range wireless communication protocol of Wi-Fi, NFC, Bluetooth, Zigbee, UWB, or the like, a second communication module 222 that performs a normal mobile communication protocol such as CDMA, WCDMA, GSM, and LTE, and a control unit 229 that collectively controls the operations of the functional units thereof. The location information relay terminal includes a location information relay control module 223 according to the present invention. The control module 223 performs a function of confirming location information and time information when the first communication module 221 receives the identification information of the user equipment 11 and transmitting the location information and the time information to a wireless Internet network via the first communication module 221 or to a mobile communication network via the second communication module 222.

The location information relay control module 223 may include an information checking unit 224, an information providing unit 226, and an information managing unit 227.

The information checking unit 224 requests the control unit. 229 for checking an SSID and a MAC address of a short-range wireless communication signal received via the first communication module 221 of the location information relay terminal 12, determines whether the SSID and the MAC address transmitted from the control unit 229 agree to the information stored and managed by the information managing unit 227, and notifies a signal indicating the determination result to the information providing unit 226 when it is determined that both pieces of information agree to each other.

When the signal indicating that both SSIDs and both MAC addresses agree to each other is received from the information checking unit 224, the information providing unit 226 requests the control unit 229 for transmitting the current location information and the time information acquired by a location information checking module 225 to the user equipment managing server 14 via the second communication module 22.

In an exemplary embodiment, the location information relay control module 223 is embodied as a software module, is installed as an application program in the location information relay terminal, is executed by the control unit 129, and is mounted on a memory 228.

In the above-mentioned embodiments of the present invention, the user equipment is carried by a user, but the present invention is not limited to the embodiments. The user equipment can be modified in various forms so as to be applicable to animals, valuables, vehicles, and the like as well as persons.

The above-mentioned embodiments of the present invention may be prepared as a program that can be executed by a computer and may be embodied in a general-purpose digital computer executing the program using a computer-readable recording medium. The data structure used in the above-mentioned embodiments of the present invention can be recorded on the computer-readable recording medium using various means. Examples of the computer-readable recording medium include magnetic recording mediums (such as a ROM, a floppy disk, and a hard disk), optically-readable mediums (such as a CD-ROM and a DVD), non-volatile memories such as an EPROM, an EEPROM and a flash memory device.

INDUSTRIAL APPLICABILITY

The present invention is applicable to a field of location management systems such as location-tracking services, public safety services, and location-based information services for easily monitoring locations of management targets such as children, dotards, mentally-retarded persons, animals, objects (valuables or vehicles) and rapidly providing the monitored information to managers (guardians or the like).

The invention claimed is:

1. A location management system for monitoring and managing a location of a user as a management target, comprising:

user equipment, carried by the management target, configured to periodically repeat an operating state and a standby state with a predetermined time interval, and to transmit a short-range wireless communication signal including identification information of the user equipment in the operating state;

a user equipment managing server configured to collect and manage user management information including the identification information of the user equipment and manager information of and managed by a manager who manages the management target; and a location information relay terminal that stores identification information the location information relay terminal configured to check whether the identification information in the received signal agrees to the stored identification information when the short-range wireless communication signal transmitted from the user equipment is received, to acquire location information of the location information relay terminal and time information, to provide the location information, the time information and the identification information to the user equipment managing server, wherein the user equipment managing server is configured to confirm the manager terminal corresponding to the received identification information based on the user management information, and to provide the received location information and the time information to the manager terminal, and wherein the location information relay terminal comprises a mobile communication terminal configured to perform a short-range communication with the user equipment and with the user equipment managing server via a mobile communication network.

2. The location management system of claim 1, wherein the user equipment comprises:

a communication module configured to perform the short-range wireless communication and to broadcast the identification information using the short-range wireless communication; and a power supply control unit configured to control power supplied to the user equipment to operate for a predetermined period of time with the predetermined period and to maintain a standby state for the other period of time.

3. The location management system of claim 1, wherein the user equipment comprises:

a communication module configured to operate as an access point of the short-range wireless communication protocol; and a control module configured to control the communication module so as to periodically operate as the access point of the short-range wireless communication protocol with the a predetermined time interval.

* * * * *